United States Patent
Li (10) Patent No.: US 8,260,305 B2
(45) Date of Patent: Sep. 4, 2012

(54) WIRELESS COMMUNICATION METHOD FOR UPDATING REFERENCE CHANNEL INFORMATION AND SYSTEM THEREOF

(75) Inventor: Cheng-Yen Li, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 343 days.

(21) Appl. No.: 12/761,011

(22) Filed: Apr. 15, 2010

(65) Prior Publication Data

US 2010/0298000 A1  Nov. 25, 2010

(30) Foreign Application Priority Data

May 21, 2009  (TW) .............................. 98116922 A (51) Int. Cl.
*H04W 36/00* (2009.01)
(52) U.S. Cl. ............. 455/440; 455/456.1; 455/450; 455/451; 455/502; 370/350; 370/338
(58) Field of Classification Search .............. 455/440, 455/450–451, 452.1, 502, 208; 370/324, 370/338, 350, 503
See application file for complete search history.

(56) References Cited

U.S. PATENT DOCUMENTS

| 6,424,840 | B1 * | 7/2002 | Fitch et al. ................. 455/456.1 |
| 2002/0094821 | A1 * | 7/2002 | Kennedy, Jr. .................. 455/456 |
| 2010/0113063 | A1 * | 5/2010 | Han et al. .................... 455/456.1 |

* cited by examiner

*Primary Examiner* — Wayne Cai
(74) *Attorney, Agent, or Firm* — Han IP Law PLLC; Andy M. Han (57) ABSTRACT

A wireless communication system capable of updating current reference channel information is provided. The wireless communication system includes a control apparatus and a plurality of reference information generating apparatuses. The wireless communication range of the control apparatus covers a plurality of regions. The reference information generating apparatuses, respectively placed in the regions, respectively report their reference position information and reference channel information to the control apparatus. When the control apparatus receives current position information from a target mobile communication apparatus, a current region among the regions is determined according to the current position information, and the control apparatus updates reference channel information according to the current region to the target mobile communication apparatus in real time.

16 Claims, 7 Drawing Sheets

WIRELESS COMMUNICATION METHOD FOR UPDATING REFERENCE CHANNEL INFORMATION AND SYSTEM THEREOF

CROSS REFERENCE TO RELATED PATENT APPLICATIONS

This patent application claims priority from Taiwan Patent Application No. 098116922, filed in the Taiwan Patent Office on May 21, 2009, and incorporates the Taiwan patent application in its entirety by reference.

TECHNICAL FIELD

The present disclosure relates to wireless communication, and more particularly, to a wireless communication system capable of updating current reference channel information and a method thereof for optimizing performance of rake receivers as well as wireless communication quality.

BACKGROUND OF THE PRESENT DISCLOSURE

Accompanied with continual advancement of communication technologies, a diversity of mobile communication devices, including mobile phones and personal digital assistants (PDAs), are now considered as necessities in the daily life of modern people.

Generally speaking, transmission channels of a wireless mobile communication system are often faced with issues of multiple access interference (MAI) and inter-symbol interference (ISI). The MAI is resulted from multi-user, whereas the ISI is resulted from multi-path-communication quality of the wireless mobile communication system is depreciated from such two issues.

To avoid undesirable effects of the MAI and ISI, a design of rake receivers in a mobile phone is adopted as a common solution. Taking a third-generation (3G) code-division multiple access (CDMA) system for example, a rake receiver implements a correlation of a spread spectrum code to search for delay signals of different paths, and then compensates time and phase of the delay signals. The compensated signals are combined to yield an output result.

Figure 1:
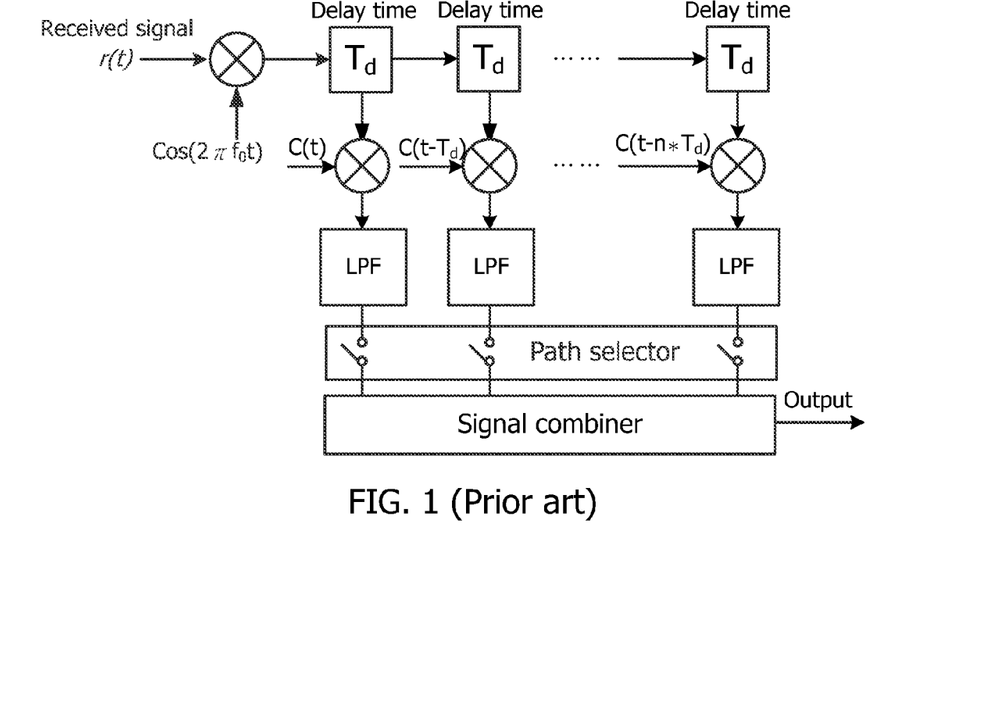
FIG. 1 is a schematic diagram of a conventional structure of a common rake receiver.

FIG. 1 shows a schematic diagram of a structure of a common rake receiver. As shown, upon receiving a signal r(t), the rake receiver multiplies the received signal r(t) by a carrier signal $\cos(2\pi f_0 t)$. Through associated calculations, the rake receiver separates different delays signals and then removes high-frequency components of the signals using a low-pass filter (LPF) to keep baseband components of the signals. A signal combiner the combines the signals via most common signal combining approaches to yield the output result.

The signal combining approaches, for example, may be equal gain combining (EGC), maximum ratio combining (MRC), selection combining (SC) and other combining approaches. The MRC is multiplying each path with a weight, and the SC discards a path that influences the final output through selection; however, both of the approaches above require an accurate channel model in order to obtain a satisfactory output result. In other words, accuracy of a channel model used plays a critical part in the MRC and SC approaches. Further, the EGC assumes that effects of each of the paths has on the final output result is equal, and yet this assumption does not quite reflect real situations.

Figure 2:
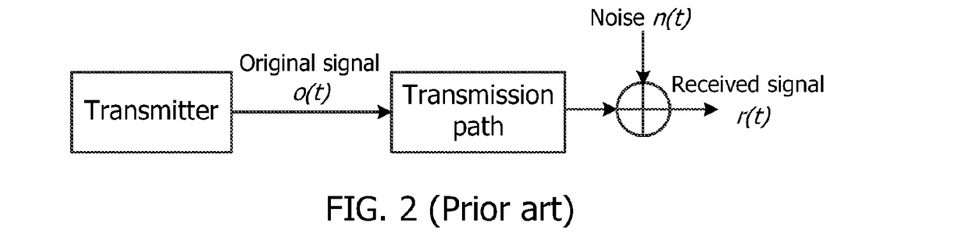
FIG. 2 is a schematic diagram of an original signal transmitted to a conventional rake receiver.

FIG. 2 shows a schematic diagram of an original signal o(t) transmitted to a rake receiver. As shown, the original signal o(t) transmitted from a transmitter passes through a transmission channel to reach the rake receiver. In practice, the original signal o(t) is prone to interferences of reflection or refraction from buildings or other objects. Since the original signal o(t) is likely interfered by a noise n(t) before reaching the rake receiver, a signal received by the rake receiver is thus a received signal r(t) interfered by the noise n(t) instead of being the original signal o(t). Therefore, the final output result from the rake receiver is inevitably affected by numerous wireless channel parameters such as time delay, phase, power and path selection. For the sake of convenience, a noise in a conventional channel model is assumed to be additive white Gaussian noise (AWGN); again, such assumption is very different from real situations. Hence, a mobile communication apparatus further utilizes a trial-and-error method or a back-end error calibration method (e.g., turbo codes that are high-performance error correction codes) to reduce its bit error rate. Yet, the error correction methods not only result in large system resource consumption but also jeopardize wireless communication quality.

Therefore, to overcome the issues above, an objective of the present disclosure is to provide a wireless communication system capable of updating current reference channel information, a mobile communication apparatus and a method thereof to overcome the issues associated with the prior art.

SUMMARY OF THE PRESENT DISCLOSURE

The present disclosure provides a wireless communication system capable of updating current reference channel information. The wireless communication system according to the present disclosure comprises a control apparatus and a plurality of reference information generating apparatuses. A communication range of the control apparatus covers a plurality of regions. The reference information generating apparatuses, respectively placed in the regions, report their reference position information and reference channel information to the control apparatus, respectively. When the control apparatus receives current position information from a target mobile communication apparatus, a current region among the regions is determined according to the current position information, and the control apparatus updates reference channel information according to the current region to the target mobile communication apparatus in real time.

The present disclosure further provides a method for operating a wireless communication system, which comprises a control apparatus and a plurality of reference information generating apparatuses. A communication range of the control apparatus covers a plurality of regions. The reference information generating apparatuses, respectively placed in the regions, transmit their reference position information and reference channel information to the control apparatus, respectively. The method comprises: transmitting reference position information and reference channel information of each of the reference information generating apparatuses to the control apparatus; and when the control apparatus receives current position information of a mobile communication apparatus, determining a current region among the regions according to the current position information, and updating current reference channel information according to the current region by the control apparatus to the mobile communication apparatus.

The present disclosure yet provides a mobile communication apparatus capable of updating current reference channel information. A communication range of the control apparatus covers a plurality of regions. The reference information generating apparatuses, respectively placed in the regions, report their reference position information and reference channel information to the control apparatus, respectively. When the mobile communication apparatus transmits current position to the control apparatus, the control apparatus determines a current region among the regions according to the current position information, and the mobile communication apparatus receives current reference channel information according to the current region from the control apparatus in real time.

Therefore, in the wireless communication system according to the present disclosure, by utilizing the reference information generating apparatuses placed in different regions, current channel information corresponding to the regions are accurately generated via the trial-and-error method to provide channel parameters corresponding to a target mobile communication apparatus in real time. Thus, the target mobile communication apparatus need not perform the resource and time consuming trial-and-error method or the back-end error calibration method needed for constructing an accurate channel model, and system resources are significantly reduced while also optimizing wireless communication quality.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

An objective of the present disclosure is to provide a wireless communication system capable of updating current reference channel information, a mobile communication apparatus and a method thereof, to effectively save system resources and optimize wireless communication quality.

Figure 3:
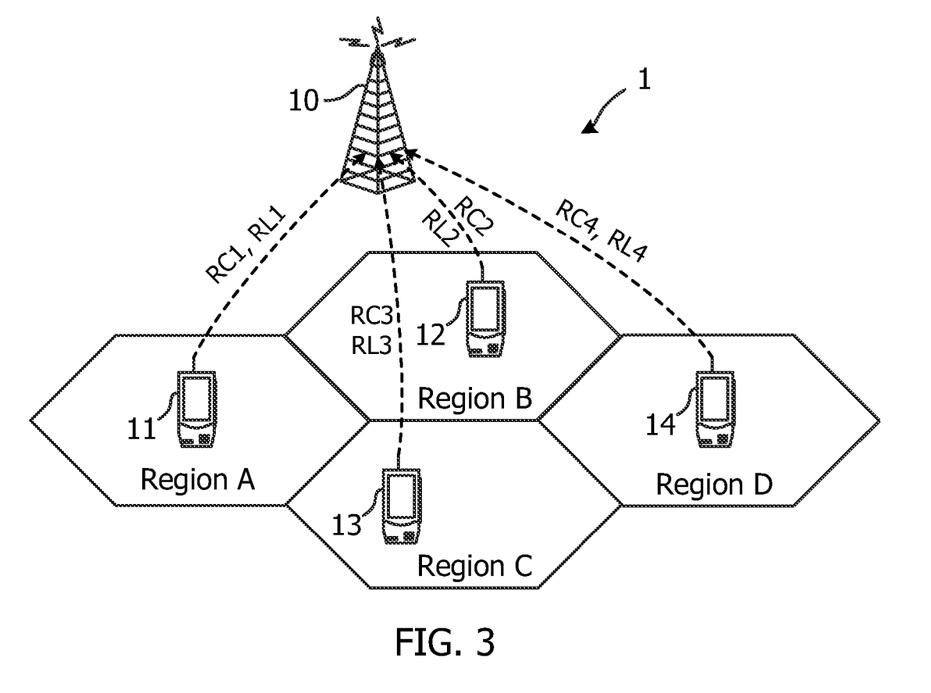
FIG. 3 is a schematic diagram of the wireless communication system according to a first embodiment of the present disclosure.

According to a first embodiment of the present disclosure, a wireless communication system is provided. FIG. 3 shows a schematic diagram of the wireless communication system. As shown, a wireless communication system 1 comprises a control apparatus 10, a first reference information generating apparatus 11, a second reference information generating apparatus 12, a third reference information generating apparatus 13 and a fourth reference information generating apparatus 14. The first reference information generating apparatus 11, the second reference information generating apparatus 12, the third reference information generating apparatus 13 and the fourth reference information generating apparatus 14 are respectively placed in a region A, a region B, a region C and a region D. A wireless communication range of the control apparatus 10 of the wireless communication system 1 covers the regions A, B, C and D, which are in a honeycomb arrangement, for example.

In practice, the control apparatus 10 may be a wireless communication base station that communicates with mobile communication apparatuses covered within a wireless communication range thereof. It is to be noted that, the four reference information generating apparatuses of the wireless communication system 1 and the four corresponding regions covered by the wireless communication range of the control apparatus 10 are for illustrative purposes only, but are not to limit the present disclosure thereto.

Further, the reference information generating apparatus may be, e.g., mobile stations that are capable of communicating with a base station or a communication network. In this embodiment, for example, each of the reference information generating apparatuses is secured at a fixed location within the corresponding region, and a range of each region is associated with the wireless communication range of the corresponding reference information generating apparatus.

In this embodiment, note that the first reference information generating apparatus 11, the second reference information generating apparatus 12, the third reference information generating apparatus 13 and the fourth reference information generating apparatus 14, are not used for performing conventional wireless communication, but mainly serve for reference channel information calculations via the rather resource-consuming trial-and-error method, to obtain reference channel information of the reference information generating apparatuses corresponding to the different regions and to periodically report the reference channel information to the control apparatus 10. Therefore, according to the present disclosure, loading of a user mobile phone is effectively reduced by saving a great amount of operation resources previously spent on calculating channel parameters.

In practice, the reference channel information may include delay time, phase, power, angle of arrival information, path selection, and other wireless channel parameters, as based upon actual requirements of different wireless communication systems.

With reference to FIG. 3, the first reference information generating apparatus 11, the second reference information generating apparatus 12, the third reference information generating apparatus 13 and the fourth reference information generating apparatus 14 periodically reports respective reference position information RL1~RL4 and reference channel information RC1~RC4 to the control apparatus 10, such that the control apparatus 10 is well-informed of real-time situations of each of the reference information generating apparatuses. For example, a report interval of each of the reference information generating apparatus may be a system default value or user-defined value according to actual needs.

The foregoing conditions describe when a user mobile communication apparatus, i.e., a target mobile communication apparatus, is outside the wireless communication range covered by the control apparatus 10. Detailed description shall be given to discuss situations when the target mobile communication apparatus is within the wireless communication range of the control apparatus 10.

Figure 4A:
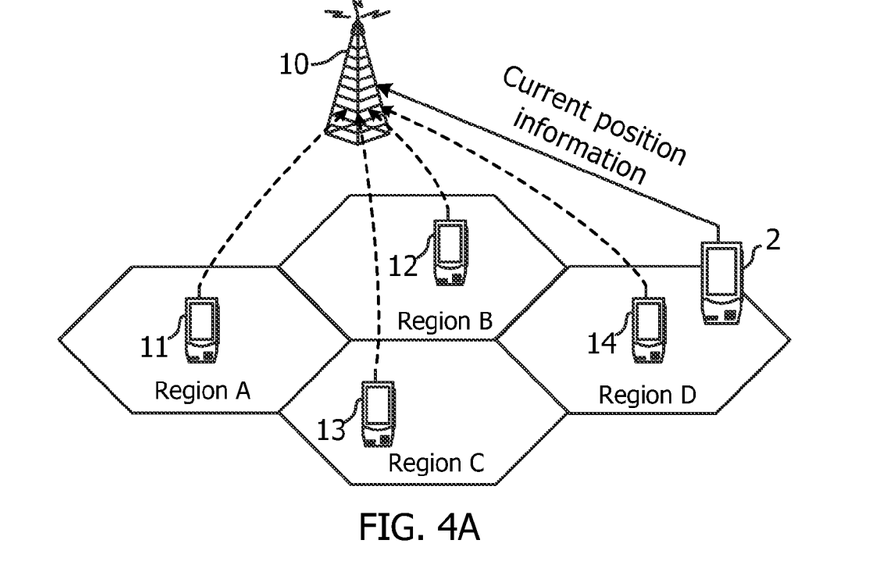
FIGS. 4A and 4B are schematic diagrams of a mobile communication apparatus having entered the wireless communication range covered by the control apparatus.
Figure 4B:
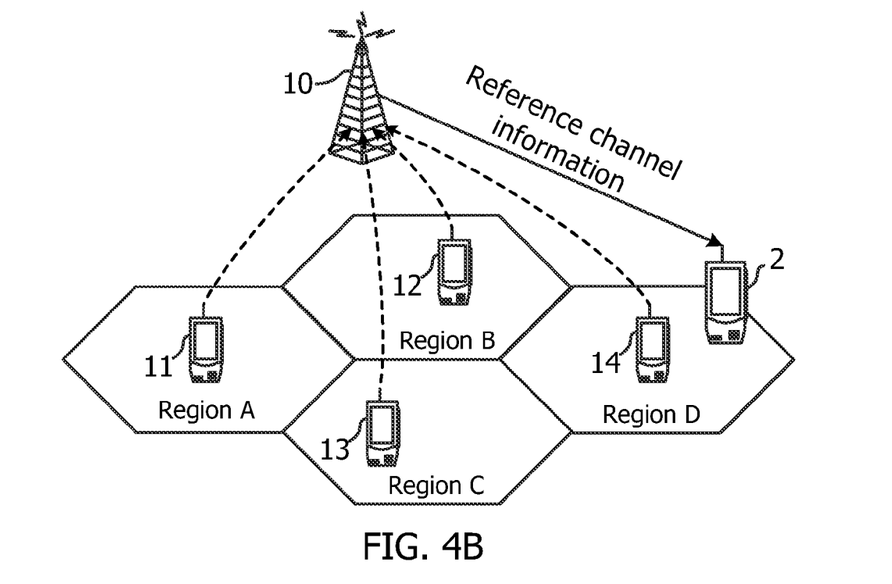

FIGS. 4A and 4B show schematic diagrams of a mobile communication apparatus 2, i.e., a target communication apparatus, having entered the wireless communication range covered by the control apparatus 10. In FIG. 4A, when the mobile communication apparatus 2 is within any of the regions A~D, it means the mobile communication apparatus 2 is within the wireless communication range covered by the control apparatus 10. More specifically, at this point, given that a wireless communication service provider of the mobile communication apparatus 2 is the same as that of the control apparatus 10, the control apparatus 10 is able to provide the mobile communication apparatus 2 with base station services, which means the control apparatus 10 and the mobile communication apparatus 2 are capable of communicating with each other.

As shown in FIG. 4A, during communication between the mobile communication apparatus 2 and the control apparatus 10, the mobile communication apparatus 2 transmits current position information thereof to the control apparatus 10, such that the control apparatus 10 stays well-informed of where the mobile communication apparatus 2 is located.

In practice, the reference position information reported by the first reference information generating apparatus 11, the second reference information generating apparatus 12, the third reference information generating apparatus 13 and the fourth reference information generating apparatus 14 to the control apparatus 10, or the current position information reported by the mobile communication apparatus 2 to the control apparatus 10, may be obtained from a positioning system including Global Positioning System (GPS), Assisted Global Positioning System (AGPS), Global Navigation Satellite System (GLONASS) and Galileo satellite navigation system.

Upon receiving the current position information from the mobile communication apparatus 2, the control apparatus 10 compares the current position information of the mobile communication apparatus 2 with reference position information of the first reference information generating apparatus 11, the second reference information generating apparatus 12, the third reference information generating apparatus 13 and the fourth reference information generating apparatus 14. Accordingly, the control apparatus 10 then determines to which of the first reference information generating apparatus 11, the second reference information generating apparatus 12, the third reference information generating apparatus 13 and the fourth reference information generating apparatus 14 the mobile communication apparatus 2 is closest, so as to find out in which of the regions A~D the mobile communication apparatus 2 is located.

In this embodiment, for example, the control apparatus 10 determines that the mobile communication apparatus 2 is located within the region D and is located closest to the fourth information generating apparatus 14. As shown in FIG. 4B, the control apparatus 10, according to reference channel information of a latest report from the fourth information generating apparatus 14, generates current reference channel information and transmits the current reference channel information to the mobile communication apparatus 2, such that the mobile communication apparatus 2 obtains current reference channel information corresponding to the currently located region D.

Upon receiving the current reference channel information from the control apparatus 10, the mobile communication apparatus 2 determines whether to accept the received current reference channel information according to a predetermined determining mechanism. For example, the predetermined determining mechanism of the mobile communication apparatus 2 is to determine whether a bit error rate of the received current reference channel information is lower than a threshold, which may be user-defined or system-defined. When it is found that the bit error rate of the current reference channel information is lower than the threshold, the mobile apparatus 2 accepts the current reference channel information and updates current channel information thereof to the current reference channel information. On the contrary, when it is determined that the bit error rate of the current reference channel information is higher than the threshold, the mobile communication apparatus 2 does not accept the current reference channel information but adopts a conventional approach, e.g., the trial-and-error method, for calculating the optimum channel information.

As mentioned, a conventional mobile communication apparatus generally utilizes the trial-and-error method or the back-end error calibration method such as turbo codes that are high-performance error correction codes to decrease its bit error rate. However, in the event that the turbo codes are still incapable of decreasing the bit error rate, the conventional mobile communication apparatus shall ask the control apparatus to again transmit a packet, which leads to degradation in transmission rate and system resource waste. Through the wireless communication system 1 according to the present disclosure, the user mobile communication apparatus (the mobile communication apparatus 2) is able to quickly and directly obtain an accurate channel model according to the current reference channel information, such that not only a processing speed of the rake receiver is increased but also unsatisfactory communication quality due to inaccurate channel models are improved.

It is to be noted that rake receivers of various manufacturers may have different designs. Therefore, in this embodiment, the first reference information generating apparatus 11, the second reference information generating apparatus 12, the third reference information generating apparatus 13 and the fourth reference information generating apparatus 14 need to have rake receivers with same designs as the mobile communication apparatus 2. That is, in actual applications, rake receivers of different designs are placed at locations where channel information is to be measured by a mobile communication service provider, so that the base station is allowed to transmit reference channel information corresponding to a model of the user mobile phone when the user mobile phone needs reference channel information.

The user mobile phone (the mobile communication apparatus 2) used as an example above has positioning capabilities; however, quite a large number of mobile phones currently used by consumers do not have such positioning capabilities. Therefore, a user mobile phone without positioning capabilities shall also be taken into consideration for discussion below.

Figure 5A:
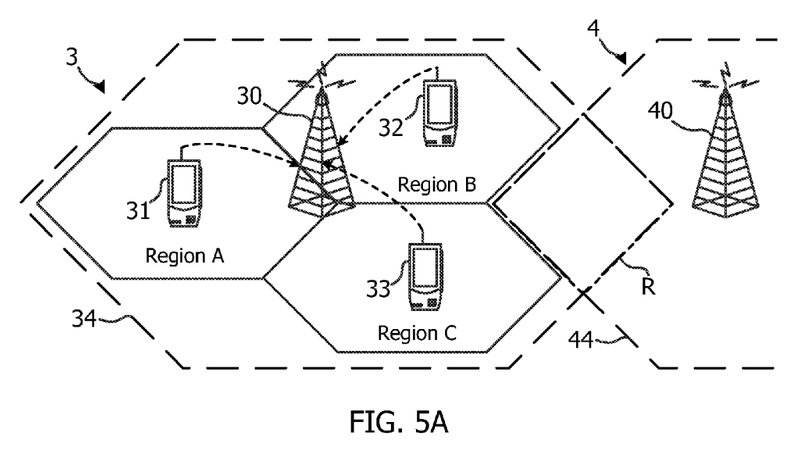
FIGS. 5A to 5C are schematic diagrams when a mobile communication apparatus without positioning capabilities having entered a wireless communication range covered by a control apparatus.
Figure 5B:
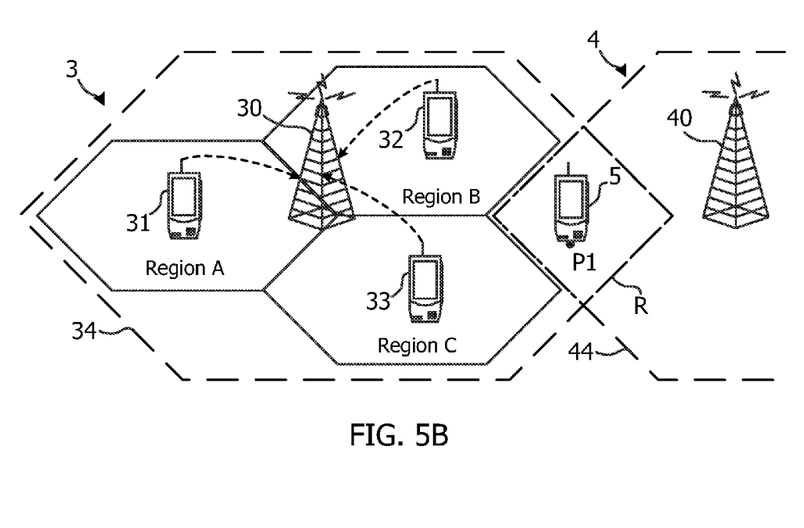
Figure 5C:
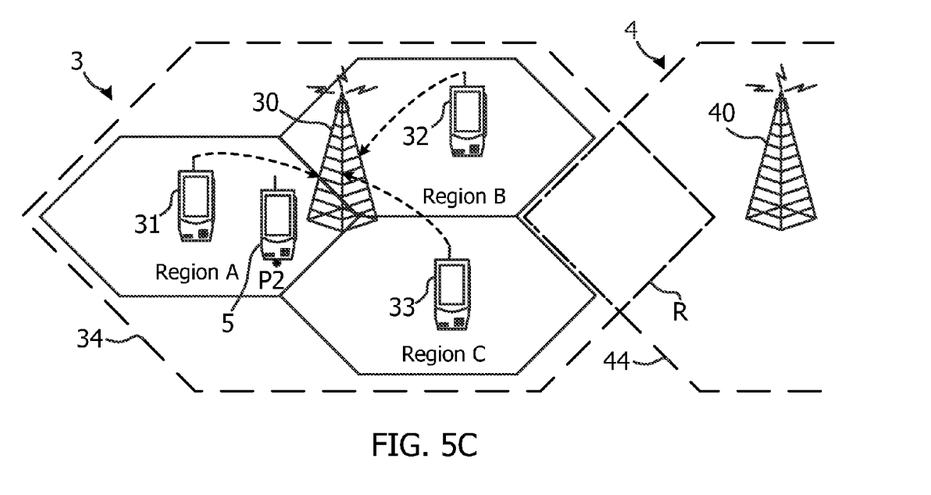

FIGS. 5A to 5C show schematic diagrams when a mobile communication apparatus 5 without positioning capabilities having entered a wireless communication range covered by a control apparatus 30. As shown in FIG. 5A, a wireless communication system 3 comprises the control apparatus 30, a first reference information generating apparatus 31, a second reference information generating apparatus 32 and a third reference information generating apparatus 33. The wireless communication range of the control apparatus 30 covers regions A~C. The first reference information generating apparatus 31, the second reference information generating apparatus 32 and the third reference information generating apparatus 33 are placed in the regions A~C, respectively. In this embodiment, the first reference information generating apparatus 31, the second reference information generating apparatus 32 and the third reference information generating apparatus 33 similarly report respective reference position information and reference channel information to the control apparatus 30.

It is to be noted that, a wireless communication range covered by a control apparatus 40 of a mobile communication system 4 next to the wireless communication system 3 partially overlaps with the wireless communication range of the control apparatus 30, with an overlapped region R as shown in FIG. 5A.

With reference to FIG. 5B, suppose the mobile communication apparatus 5 without positioning capabilities enters the overlapped region R to locate at a position P1. Located at an edge of the wireless communication range of the control apparatus 30, the overlapped region R is still within the mobile communication range of the control apparatus 30. Further, the overlapped region R is also within the wireless communication range of the control apparatus 40 such that the mobile communication apparatus is able to communicate with the control apparatus 40.

In this embodiment, supposing that the mobile communication apparatus 5 has better reception quality from the control apparatus 40 than from the control apparatus 30, it is likely that the mobile communication apparatus 5 requests for hand-over to switch communication with the control apparatus 30 of less satisfactory quality to the control apparatus 40 of better quality. When the control apparatus 30 detects the base station hand-over, the control apparatus 30 shall transmit the reference channel information directly or an average of the reference channel information of regions closer to the control apparatus 40 of the wireless communication system 4, e.g., the reference channel information of, or an average of the reference channel information of the regions B and C. Upon receiving the current reference channel information, the mobile communication apparatus 5 determines whether to accept the received current reference channel information according to a predetermined determining mechanism. For example, the predetermined determining mechanism of the mobile communication apparatus 5 is to determine whether a bit error rate of the received current reference channel information is lower than a threshold.

With reference to FIG. 5C, suppose the mobile communication apparatus 5 moves from the point P1 in FIG. 5B to a point P2 in FIG. 5C. At this point, the mobile communication apparatus 5 is no longer located at an edge of the control apparatus 30 but is near to the control apparatus 30, and the control apparatus 30 accordingly detects signals of the mobile communication apparatus 5 become stronger. Under such circumstances, the control apparatus 30 averages the reference channel information of all the regions (i.e., the regions A~C) covered by the wireless communication range of the control apparatus and transmits the average to the mobile communication apparatus 5. Through the approach above, a base station is still able to provide rough current reference channel information to a user mobile phone without positioning capabilities. The user mobile phone then, according to a predetermined determining mechanism, determines whether to accept the received current channel information provided by the base station, to use predetermined channel information calculated by a default operation mechanism, or to perform calculations for further obtaining channel information, for example.

According to a second embodiment of the present disclosure, a method for operating a wireless communication system is provided. The wireless communication system according to this embodiment comprises a control apparatus and a plurality of reference information generating apparatuses. A communication range of the control apparatus covers a plurality of regions. The reference information generating apparatuses provide respective reference position information and reference channel information, wherein the reference channel information are obtained via a trial-and-error method or a turbo code method.

Figure 6:
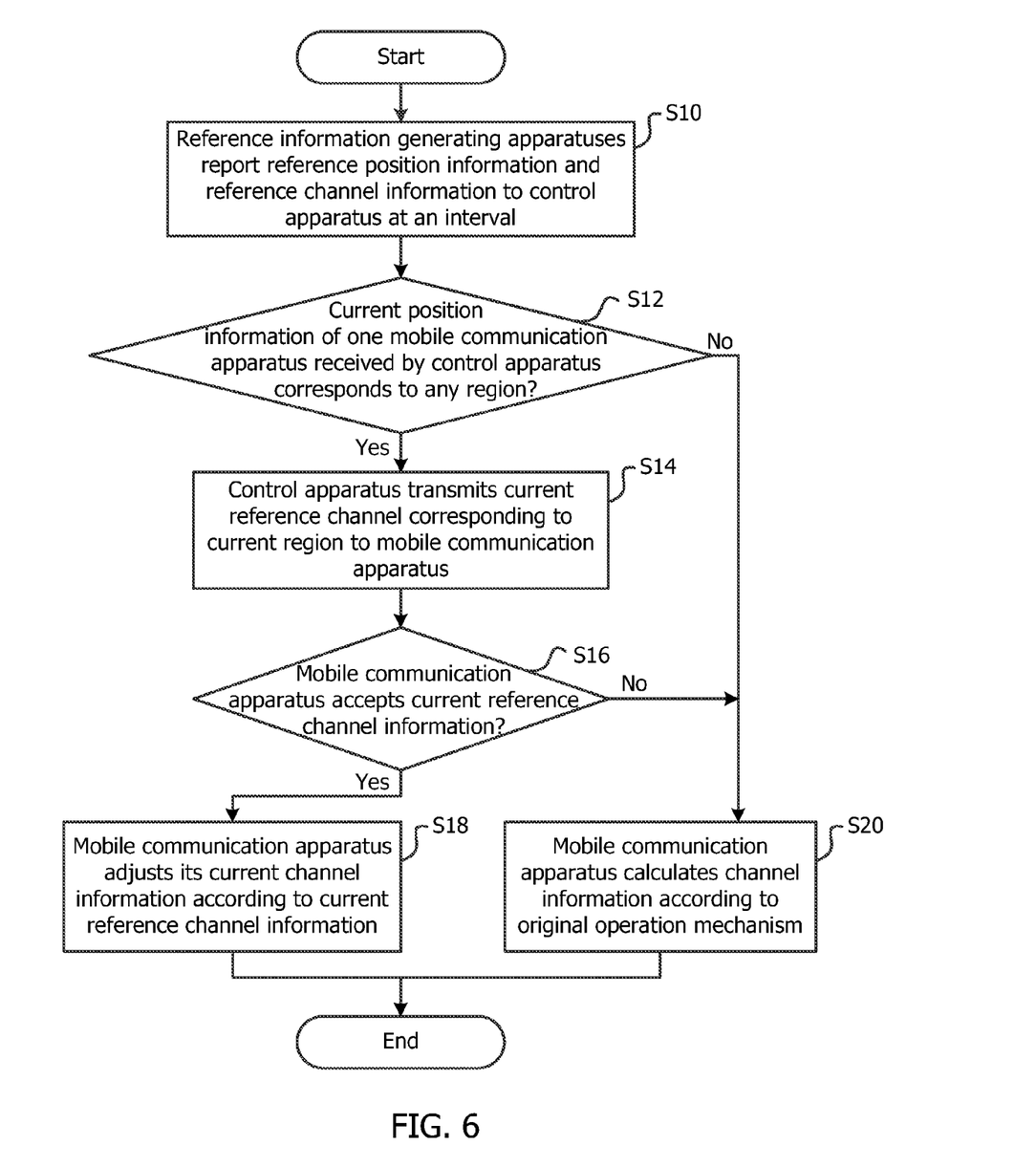
FIG. 6 is a flowchart of a method for operating a wireless communication system according to a second embodiment of the present disclosure.

FIG. 6 shows a flowchart of the method for operating the wireless communication system. As shown, the method starts with Step S10, in which the reference information generating apparatuses periodically report respective reference position information and reference channel information to the control apparatus. In practice, the reference channel information is associated with wireless channel parameters such as delay time, phase, power, angle of arrival information and path selection. In Step S12, the control apparatus receives current position information and determines whether the current reference information corresponds to a current region among the regions, i.e., the control apparatus determines a region among the regions according to the current position information. When a result from S12 is affirmative, the method goes on to Step S14, in which the control apparatus transmits current reference channel information corresponding to the current region to the mobile communication apparatus.

When the mobile communication apparatus receives the current reference channel information, Step S16 is performed. In Step S16, the mobile communication apparatus determines whether to accept the received current reference channel information. In practice, the mobile communication apparatus determines whether to accept the current reference channel information according to a predetermined determining mechanism. For example, the determining mechanism is to determine whether a bit error rate of the current reference channel information is higher than a threshold. When a result from Step S16 is affirmative, the mobile communication apparatus adjusts current channel information thereof according to the current reference channel information in Step S18. When a result from Step S16 is negative, the method goes on to Step 20, in which the mobile communication apparatus calculates channel information according to an original operation mechanism.

In practice, the mobile communication apparatus may also calculate predetermined channel information via the original operation mechanism. Upon receiving the current reference channel information, the mobile communication apparatus calculates bit error rates of the current reference channel information and the predetermined channel information. When a comparison result indicates that the bit error rate of the current reference channel information is lower than the other, the mobile communication apparatus adopts the current reference channel information as the channel information thereof, or else the mobile communication apparatus adopts the predetermined channel information as the channel information thereof.

According to a third embodiment of the present disclosure, a mobile communication apparatus is provided. In this embodiment, the communication apparatus is within a communication range of the control apparatus, and the communication range covers a plurality of regions. The mobile communication system comprises a control apparatus and a plurality of reference information generating apparatuses. The reference information generating apparatuses, respectively placed in the regions, transmit their reference position information and reference channel information to the control apparatus, respectively.

Figure 7:
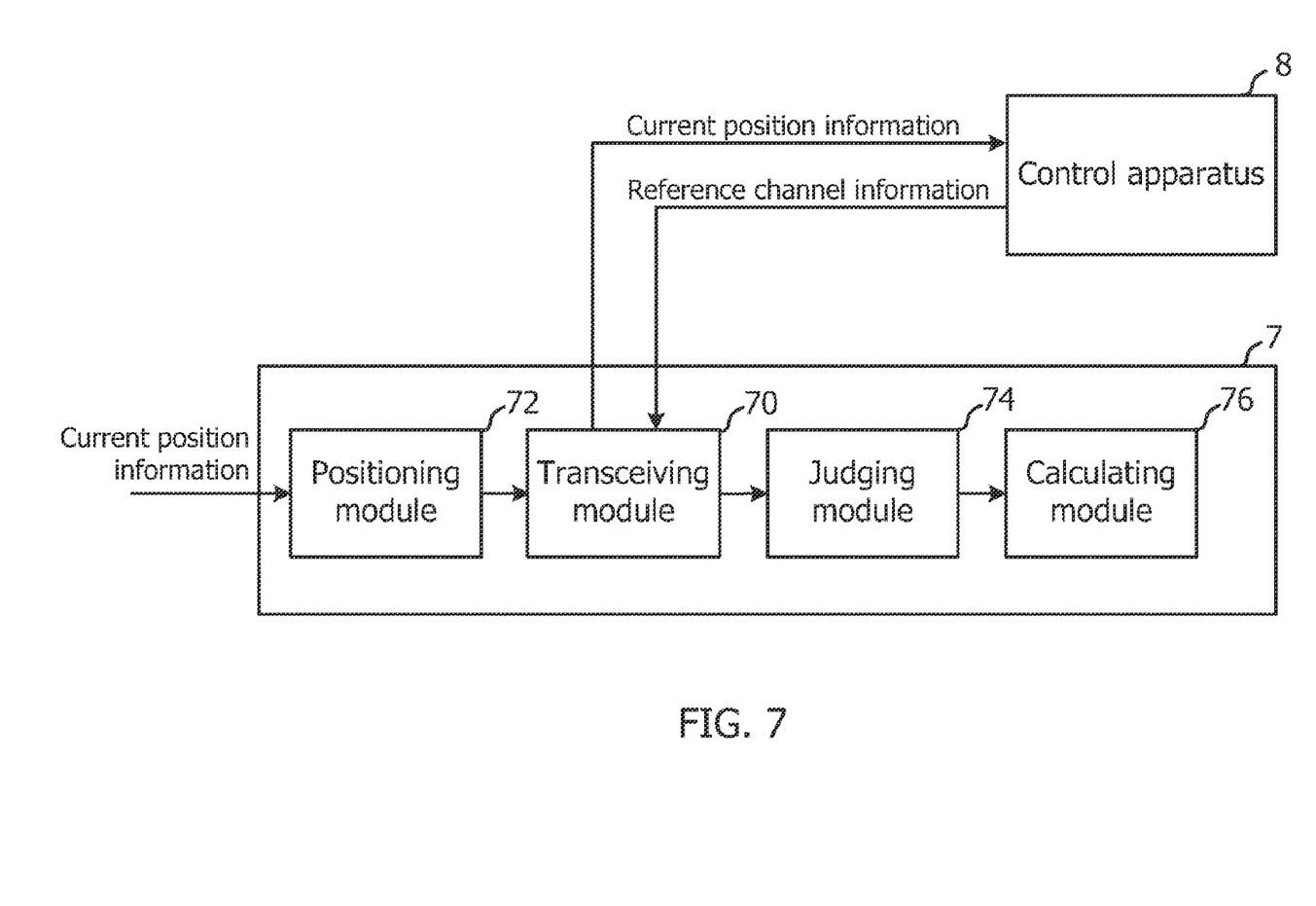
FIG. 7 is a functional block diagram of a mobile communication apparatus according to a third embodiment of the present disclosure.

FIG. 7 shows a block diagram of the mobile communication apparatus. As shown, a mobile communication apparatus 7 comprises a transceiving module 70, a positioning module 72, a judging module 74 and a calculating module 76. The positioning module 72 and the judging module 74 are coupled to the transceiving module 70, and the calculating module 76 is coupled to the judging module 74. When the mobile communication apparatus 7 enters the wireless communication range of the wireless communication system, the positioning module 72 receives current position information from a positioning system. When the transceiving module 70 of the mobile communication apparatus 7 next transmits the current position information to a control apparatus 8, the control apparatus 8 determines whether the current position information corresponds to any region among the regions, i.e., the control apparatus 8 determines a region among the regions according to the current position information.

When the control apparatus 8 determines that the current position information corresponds to a current region among the regions, the transceiving module 70 of the mobile communication apparatus 7 receives current reference channel information corresponding to the current region from the control apparatus 8 in real time. When the transceiving module 70 of the mobile communication apparatus 7 receives the current reference channel information, the judging module 74 of the mobile communication apparatus 7 determines whether to accept the current reference channel information. In practice, the judging module 74 determines whether to accept the current reference channel information according to a predetermined determining mechanism. For example, the determining mechanism is to determine whether a bit error rate of the received current reference channel information exceeds a threshold. When a result from the judging module 74 is affirmative, the calculating module 76 adjusts channel information of the mobile communication apparatus 7 according to the current reference channel information; when a result from the judging module 74 indicates that the bit error rate of the predetermined channel information is lower, the mobile communication apparatus 7 adopts the predetermined channel information as channel information thereof.

With the embodiments of the present disclosure, it is clearly illustrated that the reference information generating apparatuses placed at different regions mainly serve for generating accurate optimum channel parameters corresponding to different regions via the resource-consuming trial-and-error method, to provide a user mobile communication apparatus with the optimum channel parameters corresponding to a currently located region. Therefore, the availability of the optimum channel parameters frees the user mobile communication apparatus from performing the trial-and-error method or the back-end error correction procedure, such that system resources are significantly saved while also effectively enhancing communication quality.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless communication system capable of updating current reference channel information, the system comprising:
   a base station that covers a plurality of regions and receives current position information of a mobile communication apparatus to determine a current region among the plurality of regions; and
   a plurality of reference information generating apparatuses, respectively placed in the regions, that transmit respective reference position information and respective reference channel information to the base station, the base station transmitting to the mobile communication apparatus current reference channel information according to the current region,
   wherein the reference channel information is associated with one or more wireless channel parameters of delay time, phase, power, angle of arrival information, and path selection.

2. The wireless communication system as claimed in claim 1, wherein the reference information generating apparatus transmit respective reference position information and reference channel information at a predetermined time interval based on a system default value or a user-defined value.

3. The wireless communication system as claimed in claim 1, wherein the reference information generating apparatuses provide respective reference position information and reference channel information, and obtain the reference channel information via trial-and-error or turbo codes.

4. The wireless communication system as claimed in claim 1, wherein the mobile communication apparatus updates current channel information thereof when the mobile communication apparatus determines to accept the current reference channel information transmitted from the base station.

5. The wireless communication system as claimed in claim 1, wherein a design of rake receivers of the reference information generating apparatuses and a design of rake receivers of the mobile communication apparatus are identical.

6. The wireless communication system as claimed in claim 1, wherein the regions are in a beehive arrangement.

7. The wireless communication system as claimed in claim 1, wherein the reference position information transmitted by each of the reference information generating apparatuses is received from a positioning system.

8. The wireless communication system as claimed in claim 7, wherein the positioning system is Global Positioning System (GPS), Assisted Global Positioning System (AGPS), Global Navigation Satellite System (GLONASS), or a Galileo satellite navigation system.

9. The wireless communication system as claimed in claim 1, wherein the current position information of the mobile communication apparatus is received from a positioning system.

10. A wireless communication method for updating current reference channel information, the method comprising:
    transmitting reference position information and reference channel information from a plurality of reference information generating apparatuses to a base station, respectively; and
    transmitting current reference channel information corresponding to a current region from the base station to a mobile communication apparatus after the base station receives current position information of the mobile communication apparatus and determines the current region according to the current position information,
    wherein the reference channel information is associated with one or more wireless channel parameters of delay time, phase, power, angle of arrival information, and path selection.

11. The method as claimed in claim 10, wherein the reference information generating apparatuses respectively report the reference position information and reference channel information at a predetermined time interval based on a system default value or a user-defined value.

12. The method as claimed in claim 10, wherein the reference information generating apparatuses provide respective reference position information and reference channel information, and obtain the reference channel information via trial-and-error or turbo codes.

13. The method as claimed in claim 10, further comprising: updating current reference channel information of the mobile communication apparatus according to the current reference channel information when the mobile communication apparatus determines to accept the current reference channel information transmitted from the base station.

14. The method as claimed in claim 10, wherein the reference position information reported by each of the reference information generating apparatuses is received from a positioning system.

15. A wireless communication system capable of updating current reference channel information, the system comprising:
 a base station that covers a plurality of regions; and
 a plurality of reference information generating apparatuses, respectively placed in the regions, that report respective reference position information and respective reference channel information to the base station, the base station transmitting to a wireless communication apparatus that is within a wireless communication range of the wireless communication system current reference channel information according to communication between the base station and the mobile communication apparatus,
 wherein when the mobile communication apparatus is in a base station hand-over, wherein the base station determines the mobile communication apparatus is at an edge of at least one current region among the regions, generates the current reference channel information according to a reference channel of the at least one current region, and transmits the same to the mobile communication apparatus.

16. The wireless communication system as claimed in claim 15, wherein when a communication quality between the base station and the mobile communication apparatus is better than that during a hand-over, the base station determines the mobile communication apparatus is in the regions, generates the current reference channel information according to a reference channel of at least one current region among the regions, and transmits the same to the mobile communication apparatus.

* * * * *